(12) United States Patent
Kim et al.

(10) Patent No.: US 11,116,027 B2
(45) Date of Patent: Sep. 7, 2021

(54) ELECTRONIC APPARATUS AND OPERATION METHOD THEREOF

(71) Applicant: LG ELECTRONICS INC., Seoul (KR)

(72) Inventors: Poram Kim, Seoul (KR); Hyunchul Choi, Seoul (KR); Inyeop Jang, Seoul (KR); Salkmann Ji, Seoul (KR); Hyunsu Choi, Seoul (KR); Sungmin You, Seoul (KR); Taegil Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/730,529

(22) Filed: Dec. 30, 2019

(65) Prior Publication Data

US 2020/0154497 A1    May 14, 2020

(30) Foreign Application Priority Data

Dec. 23, 2019   (KR) .................. 10-2019-0173119

(51) Int. Cl.
| | | |
|---|---|---|
| *H04W 76/15* | (2018.01) | |
| *H04W 4/48* | (2018.01) | |
| *H04W 4/80* | (2018.01) | |
| *G06K 9/00* | (2006.01) | |

(52) U.S. Cl.
CPC ........ *H04W 76/15* (2018.02); *G06K 9/00288* (2013.01); *G06K 9/00832* (2013.01); *H04W 4/48* (2018.02)

(58) Field of Classification Search
CPC .... H04W 4/48; H04W 76/15; G06K 9/00288; G06K 9/00832
See application file for complete search history.

(56) References Cited

U.S. PATENT DOCUMENTS

| | | | | |
|---|---|---|---|---|
| 10,251,211 | B1* | 4/2019 | Tan | ......................... B60N 2/002 |
| 2006/0034490 | A1* | 2/2006 | Mihara | ................... G06T 7/246 |
| | | | | 382/107 |
| 2013/0088581 | A1* | 4/2013 | Arai | .................... H04N 5/23293 |
| | | | | 348/54 |
| 2014/0018000 | A1* | 1/2014 | Seymour | ............... H04W 48/16 |
| | | | | 455/41.2 |
| 2014/0135598 | A1* | 5/2014 | Weidl | ..................... A61B 5/163 |
| | | | | 600/301 |
| 2014/0346160 | A1* | 11/2014 | Moench | ............... H05B 1/0236 |
| | | | | 219/202 |

(Continued)

FOREIGN PATENT DOCUMENTS

| | | |
|---|---|---|
| KR | 10-2008-0042357 A | 5/2008 |
| KR | 10-2015-0034336 A | 4/2015 |

*Primary Examiner* — Dominic E Rego
(74) *Attorney, Agent, or Firm* — Birch, Stewart, Kolasch & Birch LLP

(57) ABSTRACT

Provided is a method of storing information on a face of a passenger in a vehicle in association with a terminal of the passenger, and an electronic apparatus therefor. In the present disclosure, at least one of an electronic apparatus, a vehicle, a vehicle terminal, and an autonomous vehicle may be connected or converged with an artificial intelligence (AI) module, an unmanned aerial vehicle (UAV), a robot, an augmented reality (AR) device, a virtual reality (VR) device, a device associated with a 5G service, and the like.

18 Claims, 11 Drawing Sheets

(56) References Cited

U.S. PATENT DOCUMENTS

| | | | |
|---|---|---|---|
| 2017/0113801 A1* | 4/2017 | Brunaux | B64D 47/08 |
| 2017/0124831 A1* | 5/2017 | Li | G06K 9/00838 |
| 2017/0272660 A1* | 9/2017 | Ishihara | G06T 7/20 |
| 2018/0089785 A1* | 3/2018 | Imoto | G01C 21/206 |
| 2018/0162267 A1* | 6/2018 | Kline | B60W 50/14 |
| 2018/0262834 A1* | 9/2018 | Oho | H04R 3/12 |
| 2018/0307245 A1* | 10/2018 | Khawaja | G05D 1/0212 |
| 2019/0005310 A1* | 1/2019 | Kim | G08B 13/196 |
| 2019/0012442 A1* | 1/2019 | Hunegnaw | G06K 9/00228 |
| 2019/0056732 A1* | 2/2019 | Aoi | B60W 50/14 |
| 2019/0057209 A1* | 2/2019 | Dyer | G08B 13/19647 |
| 2019/0324458 A1* | 10/2019 | Sadeghi | G05D 1/0088 |
| 2020/0041997 A1* | 2/2020 | Tuukkanen | B60W 30/0956 |
| 2020/0110532 A1* | 4/2020 | Mani | G06F 3/04847 |
| 2020/0143235 A1* | 5/2020 | Seko | G10L 13/00 |
| 2020/0329342 A1* | 10/2020 | Beaurepaire | H04W 4/029 |

\* cited by examiner

ELECTRONIC APPARATUS AND OPERATION METHOD THEREOF

CROSS-REFERENCE TO RELATED APPLICATION

This application claims the benefit of Korean Patent Application No. 10-2019-0173119, filed on Dec. 23, 2019, in the Korean Intellectual Property Office, the disclosure of which is incorporated herein in its entirety by reference.

BACKGROUND

1. Field

This disclosure relates to an electronic apparatus and an operation method thereof.

2. Description of the Related Art

A vehicle environment in which an in-vehicle device and a passenger terminal are interlocked through a communication connection is becoming more common and various studies are being conducted to increase user convenience in such a vehicle environment.

An autonomous vehicle refers to a vehicle equipped with an autonomous driving device that recognizes an environment around the vehicle and a state of the vehicle to control driving of the vehicle based on the environment and the state. With progress in research on autonomous vehicles, studies on various services that may increase a user's convenience using the autonomous vehicle are also being conducted.

SUMMARY

An aspect provides an electronic apparatus and an operation method thereof. Technical goals to be achieved through the example embodiments are not limited to the technical goals as described above, and other technical tasks can be inferred from the following example embodiments.

According to an aspect, there is provided an operation method of an electronic apparatus, the method including recognizing a face of a passenger in a vehicle through a sensor, acquiring information on a position of the passenger and information on a position of a terminal in the vehicle, and storing, when a difference between the position of the passenger and the position of the vehicle is within a preset distance, information on the recognized face in association with the terminal based on the acquired information.

According to another aspect, there is also provided an electronic apparatus including an interface configured to acquire sensing information of a face of a passenger in a vehicle from a sensor, and a processor configured to recognize the face of the passenger based on the acquired sensing information, and store information on the recognized face in association with the terminal based on information on a position of the passenger acquired through the interface and information on a position of a terminal in the vehicle when a difference between the position of the passenger and the position of the terminal is within a preset distance.

According to another aspect, there is also provided a vehicle including a sensor, and an electronic apparatus that recognizes a face of a passenger in the vehicle based on sensing information acquired from the sensor, acquires information on a position of the passenger and information on a position of a terminal in the vehicle, and stores, when a difference between the position of the passenger and the position of the vehicle is within a preset distance, information on the recognized face in association with the terminal based on the acquired information.

According to another aspect, there is also provided a non-volatile computer-readable recording medium including a computer program for performing the above-described method.

Specific details of example embodiments are included in the detailed description and drawings.

BRIEF DESCRIPTION OF THE DRAWINGS

The above and other aspects, features, and advantages of certain embodiments will be more apparent from the following detailed description taken in conjunction with the accompanying drawings, in which.

DETAILED DESCRIPTION

Figure 1:
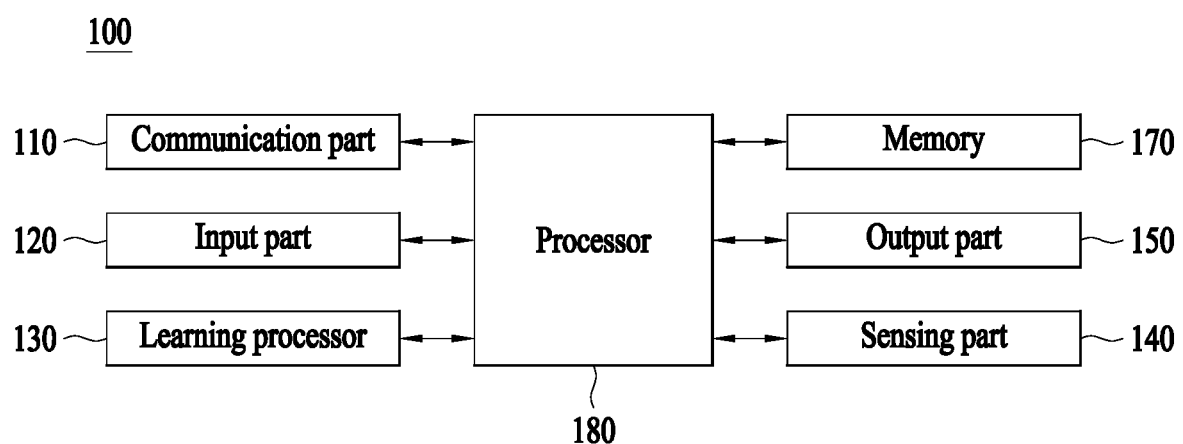
FIG. 1 illustrates an artificial intelligence (AI) device according to an example embodiment.

The terms used in the embodiments are selected, as much as possible, from general terms that are widely used at present while taking into consideration the functions obtained in accordance with the present disclosure, but these terms may be replaced by other terms based on intentions of those skilled in the art, customs, emergence of new technologies, or the like. Also, in a particular case, terms that are arbitrarily selected by the applicant of the present disclosure may be used. In this case, the meanings of these terms may be described in corresponding description parts of the disclosure. Accordingly, it should be noted that the terms used herein should be construed based on practical meanings thereof and the whole content of this specification, rather than being simply construed based on names of the terms.

In the entire specification, when an element is referred to as "including" another element, the element should not be understood as excluding other elements so long as there is no special conflicting description, and the element may include at least one other element. In addition, the terms "unit" and "module", for example, may refer to a component that exerts at least one function or operation, and may be realized in hardware or software, or may be realized by combination of hardware and software.

In addition, in this specification, "artificial intelligence (AI)" refers to the field of studying artificial intelligence or a methodology capable of making the artificial intelligence, and "machine learning" refers to the field of studying methodologies that define and solve various problems handled in the field of artificial intelligence. The machine learning is also defined as an algorithm that enhances performance for a certain operation through a steady experience with respect to the operation.

An "artificial neural network (ANN)" may refer to a general model for use in the machine learning, which is composed of artificial neurons (nodes) forming a network by synaptic connection and has problem solving ability. The artificial neural network may be defined by a connection pattern between neurons of different layers, a learning process of updating model parameters, and an activation function of generating an output value.

The artificial neural network may include an input layer and an output layer, and may selectively include one or more hidden layers. Each layer may include one or more neurons, and the artificial neural network may include a synapse that interconnects neurons. In the artificial neural network, each neuron may output the value of an activation function concerning signals input through the synapse, weights, and deflection thereof.

The model parameters refer to parameters determined by learning, and include weights for synaptic connection and deflection of neurons, for example. Then, hyper-parameters refer to parameters to be set before learning in a machine learning algorithm, and include a learning rate, the number of repetitions, the size of a mini-batch, and an initialization function, for example.

It can be said that the purpose of learning of the artificial neural network is to determine a model parameter that minimizes a loss function. The loss function may be used as an index for determining an optimal model parameter in a learning process of the artificial neural network.

The machine learning may be classified, according to a learning method, into supervised learning, unsupervised learning, and reinforcement learning.

The supervised learning refers to a learning method for an artificial neural network in the state in which a label for learning data is given. The label may refer to a correct answer (or a result value) to be deduced by the artificial neural network when learning data is input to the artificial neural network. The unsupervised learning may refer to a learning method for the artificial neural network in the state in which no label for learning data is given. The reinforcement learning may refer to a learning method in which an agent defined in a certain environment learns to select a behavior or a behavior sequence that maximizes cumulative compensation in each state.

The machine learning realized by a deep neural network (DNN) including multiple hidden layers among artificial neural networks is also called deep learning, and the deep learning is a part of the machine learning. In the following description, the machine learning is used as a meaning including the deep learning.

In addition, in this specification, a vehicle may be an autonomous vehicle. "Autonomous driving" refers to a self-driving technology, and an "autonomous vehicle" refers to a vehicle that performs driving without a user's operation or with a user's minimum operation. In addition, the autonomous vehicle may refer to a robot having an autonomous driving function.

For example, autonomous driving may include all of a technology of maintaining the lane in which a vehicle is driving, a technology of automatically adjusting a vehicle speed such as adaptive cruise control, a technology of causing a vehicle to automatically drive in a given route, and a technology of automatically setting a route, along which a vehicle drives, when a destination is set.

Here, a vehicle may include all of a vehicle having only an internal combustion engine, a hybrid vehicle having both an internal combustion engine and an electric motor, and an electric vehicle having only an electric motor, and may be meant to include not only an automobile but also a train and a motorcycle, for example.

In the following description, embodiments of the present disclosure will be described in detail with reference to the drawings so that those skilled in the art can easily carry out the present disclosure. The present disclosure may be embodied in many different forms and is not limited to the embodiments described herein.

Hereinafter, example embodiments of the present disclosure will be described with reference to the drawings.

FIG. 1 illustrates an AI device according to an example embodiment.

The AI device 100 may be realized into, for example, a stationary appliance or a movable appliance, such as a TV, a projector, a cellular phone, a smartphone, a desktop computer, a laptop computer, a digital broadcasting terminal, a personal digital assistant (PDA), a portable multimedia player (PMP), a navigation system, a tablet PC, a wearable device, a set-top box (STB), a DMB receiver, a radio, a washing machine, a refrigerator, a digital signage, a robot, a vehicle, or an X reality (XR) device.

Referring to FIG. 1, the AI device 100 may include a communication part 110, an input part 120, a learning processor 130, a sensing part 140, an output part 150, a memory 170, and a processor 180. However, not all components shown in FIG. 1 are essential components of the AI device 100. The AI device may be implemented by more components than those illustrated in FIG. 1, or the AI device may be implemented by fewer components than those illustrated in FIG. 1.

The communication part 110 may transmit and receive data to and from external devices, such as other AI devices 100a to 100e and an AI server 200, using wired/wireless communication technologies. For example, the communication part 110 may transmit and receive sensor information, user input, learning models, and control signals, for example, to and from external devices.

At this time, the communication technology used by the communication part 110 may be, for example, a global system for mobile communication (GSM), code division multiple access (CDMA), long term evolution (LTE), 5G, wireless LAN (WLAN), wireless-fidelity (Wi-Fi), Bluetooth, radio frequency identification (RFID), infrared data association (IrDA), ZigBee, or near field communication (NFC).

The input part 120 may acquire various types of data.

At this time, the input part 120 may include a camera for the input of an image signal, a microphone for receiving an audio signal, and a user input part for receiving information input by a user, for example. Here, the camera or the microphone may be handled as a sensor, and a signal acquired from the camera or the microphone may be referred to as sensing data or sensor information.

The input part 120 may acquire, for example, input data to be used when acquiring an output using learning data for model learning and a learning model. The input part 120 may acquire unprocessed input data, and in this case, the processor 180 or the learning processor 130 may extract an input feature as pre-processing for the input data.

The learning processor 130 may cause a model configured with an artificial neural network to learn using the learning data. Here, the learned artificial neural network may be called a learning model. The learning model may be used to deduce a result value for newly input data other than the learning data, and the deduced value may be used as a determination base for performing any operation.

At this time, the learning processor 130 may perform AI processing along with a learning processor 240 of the AI server 200.

At this time, the learning processor 130 may include a memory integrated or embodied in the AI device 100. Alternatively, the learning processor 130 may be realized using the memory 170, an external memory directly coupled to the AI device 100, or a memory held in an external device.

The sensing part 140 may acquire at least one of internal information of the AI device 100, environmental information around the AI device 100, and user information using various sensors.

At this time, the sensors included in the sensing part 140 may be a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, a radar, and a temperature sensor, for example.

The output part 150 may generate, for example, a visual output, an auditory output, or a tactile output.

At this time, the output part 150 may include, for example, a display that outputs visual information, a speaker that outputs auditory information, and a haptic module that outputs tactile information.

The memory 170 may store data which assists various functions of the AI device 100. For example, the memory 170 may store input data acquired by the input part 120, learning data, learning models, and learning history, for example. The memory 170 may include a storage medium of at least one type among a flash memory, a hard disk, a multimedia card micro type memory, a card type memory (e.g., SD or XD memory), a random access memory (RAM) a static random access memory (SRAM), a read only memory (ROM), an electrically erasable programmable read-only memory (EEPROM), a programmable read-only memory (PROM), a magnetic memory, a magnetic disc, and an optical disc.

The processor 180 may determine at least one executable operation of the AI device 100 based on information determined or generated using a data analysis algorithm or a machine learning algorithm. Then, the processor 180 may control constituent elements of the AI device 100 to perform the determined operation.

To this end, the processor 180 may request, search, receive, or utilize data of the learning processor 130 or the memory 170, and may control the constituent elements of the AI device 100 so as to execute a predictable operation or an operation that is deemed desirable among the at least one executable operation.

At this time, when connection of an external device is required to perform the determined operation, the processor 180 may generate a control signal for controlling the external device and may transmit the generated control signal to the external device.

The processor 180 may acquire intention information with respect to user input and may determine a user request based on the acquired intention information.

At this time, the processor 180 may acquire intention information corresponding to the user input using at least one of a speech to text (STT) engine for converting voice input into a character string and a natural language processing (NLP) engine for acquiring natural language intention information.

At this time, at least a part of the STT engine and/or the NLP engine may be configured with an artificial neural network learned according to a machine learning algorithm. Then, the STT engine and/or the NLP engine may have learned by the learning processor 130, may have learned by a learning processor 240 of the AI server 200, or may have learned by distributed processing of these processors.

The processor 180 may collect history information including, for example, the content of an operation of the AI device 100 or feedback of the user with respect to an operation, and may store the collected information in the memory 170 or the learning processor 130, or may transmit the collected information to an external device such as the AI server 200. The collected history information may be used to update a learning model.

The processor 180 may control at least some of the constituent elements of the AI device 100 in order to drive an application program stored in the memory 170. Moreover, the processor 180 may combine and operate two or more of the constituent elements of the AI device 100 for the driving of the application program.

Figure 2:
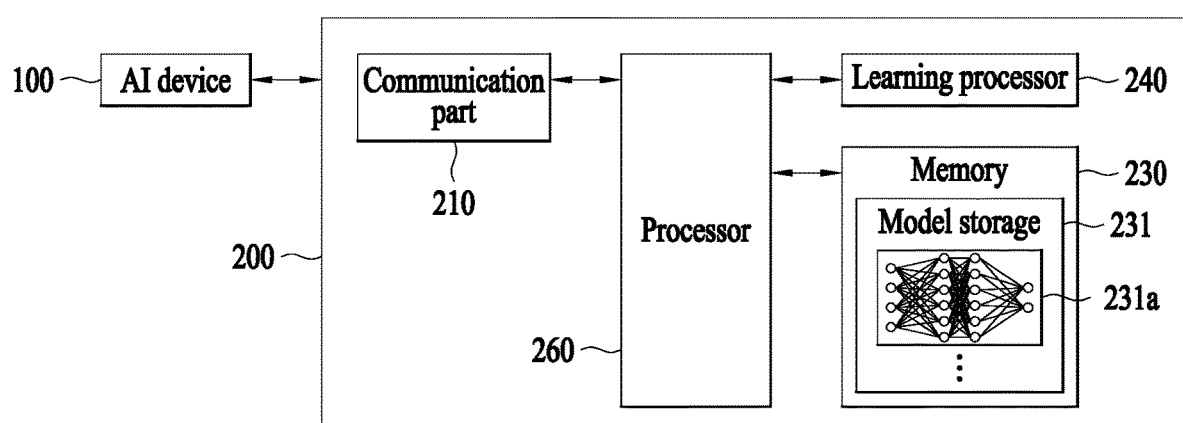
FIG. 2 illustrates an AI server according to an example embodiment.

FIG. 2 illustrates an AI server according to an example embodiment.

Referring to FIG. 2, an AI server 200 may refer to a device that causes an artificial neural network to learn using a machine learning algorithm or uses the learned artificial neural network. Here, the AI server 200 may be constituted of multiple servers to perform distributed processing, and may be defined as a 5G network. At this time, the AI server 200 may be included as a constituent element of the AI device 100 so as to perform at least a part of AI processing together with the AI device.

The AI server 200 may include a communication part 210, a memory 230, a learning processor 240, and a processor 260.

The communication part 210 may transmit and receive data to and from an external device such as the AI device 100.

The memory 230 may include a model storage 231. The model storage 231 may store a model (or an artificial neural network 231a) which is learning or has learned via the learning processor 240.

The learning processor 240 may cause the artificial neural network 231a to learn learning data. A learning model may be used in the state of being mounted in the AI server 200 of the artificial neural network, or may be used in the state of being mounted in an external device such as the AI device 100.

The learning model may be realized in hardware, software, or a combination of hardware and software. In the case in which a part or the entirety of the learning model is realized in software, one or more instructions constituting the learning model may be stored in the memory 230.

The processor 260 may deduce a result value for newly input data using the learning model, and may generate a response or a control instruction based on the deduced result value.

Figure 3:
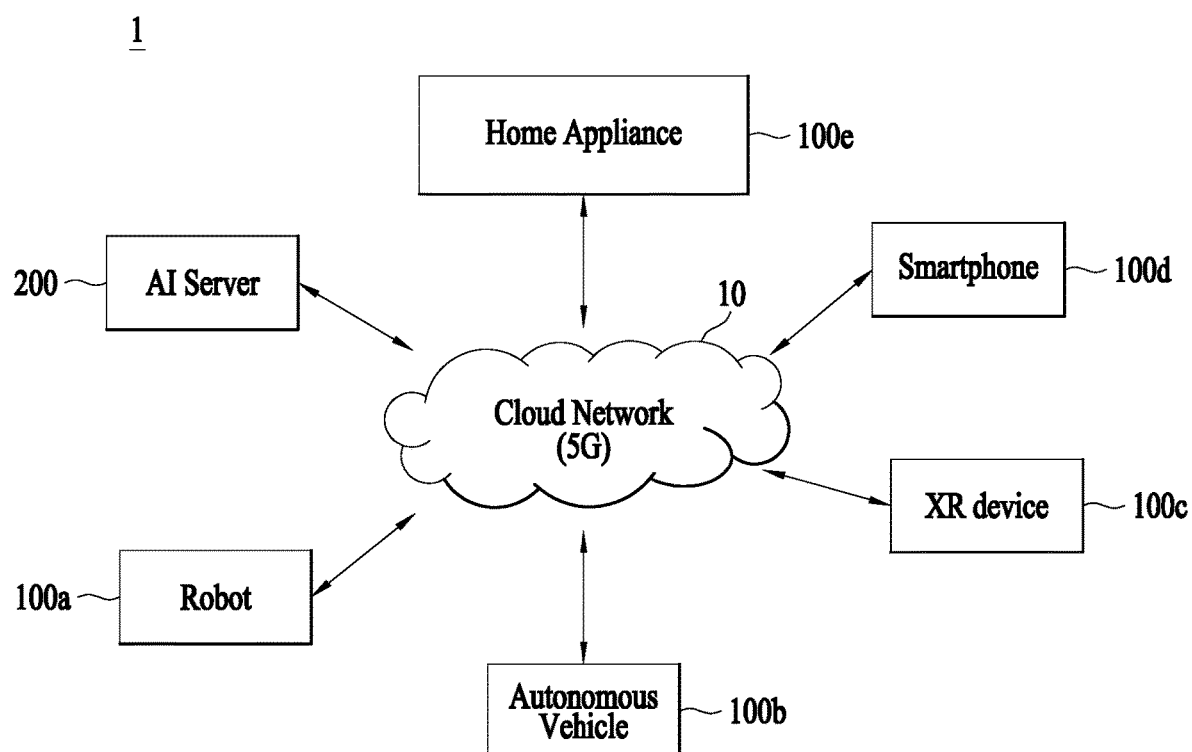
FIG. 3 illustrates an AI system according to an example embodiment.

FIG. 3 illustrates an AI system according to an example embodiment.

Referring to FIG. 3, in the AI system 1, at least one of the AI server 200, a robot 100*a*, an autonomous vehicle 100*b*, an XR device 100*c*, a smartphone 100*d*, and a home appliance 100*e* is connected to a cloud network 10. Here, the robot 100*a*, the autonomous vehicle 100*b*, the XR device 100*c*, the smartphone 100*d*, and the home appliance 100*e*, to which AI technologies are applied, may be referred to as AI devices 100*a* to 100*e*.

The cloud network 10 may constitute a part of a cloud computing infrastructure, or may refer to a network present in the cloud computing infrastructure. Here, the cloud network 10 may be configured using a 3G network, a 4G or long term evolution (LTE) network, or a 5G network, for example.

That is, respective devices 100*a* to 100*e* and 200 constituting the AI system 1 may be connected to each other via the cloud network 10. In particular, respective devices 100*a* to 100*e* and 200 may communicate with each other via a base station, or may perform direct communication without the base station.

The AI server 200 may include a server which performs AI processing and a server which performs an operation with respect to big data.

The AI server 200 may be connected to at least one of the robot 100*a*, the autonomous vehicle 100*b*, the XR device 100*c*, the smartphone 100*d*, and the home appliance 100*e*, which are AI devices constituting the AI system 1, via cloud network 10, and may assist at least a part of AI processing of connected the AI devices 100*a* to 100*e*.

At this time, instead of the AI devices 100*a* to 100*e*, the AI server 200 may cause an artificial neural network to learn according to a machine learning algorithm, and may directly store a learning model or may transmit the learning model to the AI devices 100*a* to 100*e*.

At this time, the AI server 200 may receive input data from the AI devices 100*a* to 100*e*, may deduce a result value for the received input data using the learning model, and may generate a response or a control instruction based on the deduced result value to transmit the response or the control instruction to the AI devices 100*a* to 100*e*.

Alternatively, the AI devices 100*a* to 100*e* may directly deduce a result value with respect to input data using the learning model, and may generate a response or a control instruction based on the deduced result value.

Hereinafter, various example embodiments of the AI devices 100*a* to 100*e*, to which the above-described technology is applied, will be described. Here, the AI devices 100*a* to 100*e* illustrated in FIG. 3 may be specific example embodiments of the AI device 100 illustrated in FIG. 1.

The autonomous vehicle 100*b* may be realized into a mobile robot, a vehicle, or an unmanned air vehicle, for example, through the application of AI technologies.

The autonomous vehicle 100*b* may include an autonomous driving control module for controlling an autonomous driving function, and the autonomous driving control module may mean a software module or a chip realized in hardware. The autonomous driving control module may be a constituent element included in the autonomous vehicle 1200*b*, but may be a separate hardware element outside the autonomous vehicle 1200*b* so as to be connected thereto.

The autonomous vehicle 100*b* may acquire information on the state of the autonomous vehicle 1200*b* using sensor information acquired from various types of sensors, may detect or recognize the surrounding environment and an object, may generate map data, may determine a movement route and a driving plan, or may determine an operation.

Here, the autonomous vehicle 100*b* may use sensor information acquired from at least one sensor among a lidar, a radar, and a camera in the same manner as the robot 1200*a* in order to determine a movement route and a driving plan.

In particular, the autonomous vehicle 100*b* may recognize the environment or an object with respect to an area outside the field of vision or an area located at a predetermined distance or more by receiving sensor information from external devices, or may directly receive recognized information from external devices.

The autonomous vehicle 100*b* may perform the above-described operations using a learning model configured with at least one artificial neural network. For example, the autonomous vehicle 100*b* may recognize the surrounding environment and the object using the learning model, and may determine a driving line using the recognized surrounding environment information or object information. Here, the learning model may be directly learned in the autonomous vehicle 100*b*, or may be learned in an external device such as the AI server 200.

At this time, the autonomous vehicle 100*b* may generate a result using the learning model to perform an operation, but may transmit sensor information to an external device such as the AI server 200 and receive a result generated by the external device to perform an operation.

The autonomous vehicle 100*b* may determine a movement route and a driving plan using at least one of map data, object information detected from sensor information, and object information acquired from an external device, and a drive part may be controlled to drive the autonomous vehicle 100*b* according to the determined movement route and driving plan.

The map data may include object identification information for various objects arranged in a space (e.g., a road) along which the autonomous vehicle 100*b* drives. For example, the map data may include object identification information for stationary objects, such as streetlights, rocks, and buildings, and movable objects such as vehicles and pedestrians. Then, the object identification information may include names, types, distances, and locations, for example.

In addition, the autonomous vehicle 100*b* may perform an operation or may drive by controlling the drive part based on user control or interaction. At this time, the autonomous vehicle 100*b* may acquire interactional intention information depending on a user operation or voice expression, and may determine a response based on the acquired intention information to perform an operation.

In the present disclosure, a vehicle may include a sensor and an electronic apparatus. The electronic apparatus may recognize a face of a passenger in the vehicle based on sensing information acquired from the sensor, acquire information on a position of the passenger and information on a position of a terminal in the vehicle, and store, when a difference between the position of the passenger and the position of the vehicle is within a preset distance, information on the recognized face in association with the terminal based on the acquired information. The sensor may include at least one of a radar sensor, a lidar sensor, and an image sensor such as a camera.

The electronic apparatus may recognize a face of a passenger based on the sensing information acquired from the sensor.

The electronic apparatus may acquire information on a position of the passenger and information on a position of a terminal. When a difference between the position of the passenger and the position of the vehicle is within a preset distance, the electronic apparatus may store information on the recognized face in association with the terminal based on the acquired information.

The electronic apparatus may recognize a first terminal in the vehicle. The electronic apparatus may determine whether a first face associated with the first terminal is present among faces of one or more passengers in the vehicle, based on first face information stored in association with the first terminal. As a determination result, when the first face is absent, the electronic apparatus may store information on a second face among the faces of the one or more passengers in association with the first terminal.

The electronic apparatus may transmit the information on the recognized face to one or more terminals in the vehicle through a communication part. The electronic apparatus may store the information on the recognized face in association with a terminal among the one or more terminals, based on information input in the one or more terminals.

The electronic apparatus may acquire information on a voice of the passenger and store the information on the voice in association with the terminal.

The electronic apparatus may recognize a first face of a first passenger. The electronic apparatus may recognize a first terminal associated with the recognized first face based on terminal information and face information correspondingly stored in a database. The electronic apparatus may establish communication connection with the first terminal.

The electronic apparatus may recognize faces of a plurality of passengers. The electronic apparatus may recognize terminals respectively associated with the recognized faces based on terminal information and face information correspondingly stored in a database. The electronic apparatus may determine priorities for communication connection with the terminals. The electronic apparatus may establish communication connection with the terminals based on the determined priorities.

The electronic apparatus may determine priorities for communication connection with the terminals based on information on the recognized faces.

The electronic apparatus may establish communication connection with a first terminal of a first passenger. When a preset event occurs in a second terminal of a second passenger, the electronic apparatus may determine whether face information associated with the second terminal is preset passenger face information. As a determination result, when the face information associated with the second terminal is the preset passenger face information, the electronic apparatus may establish communication connection with the second terminal.

The electronic apparatus may establish communication connection with the first terminal. The electronic apparatus may allow only a passenger having a face associated with the first terminal to control the first terminal, based on face information stored in association with the first terminal.

Figure 4:
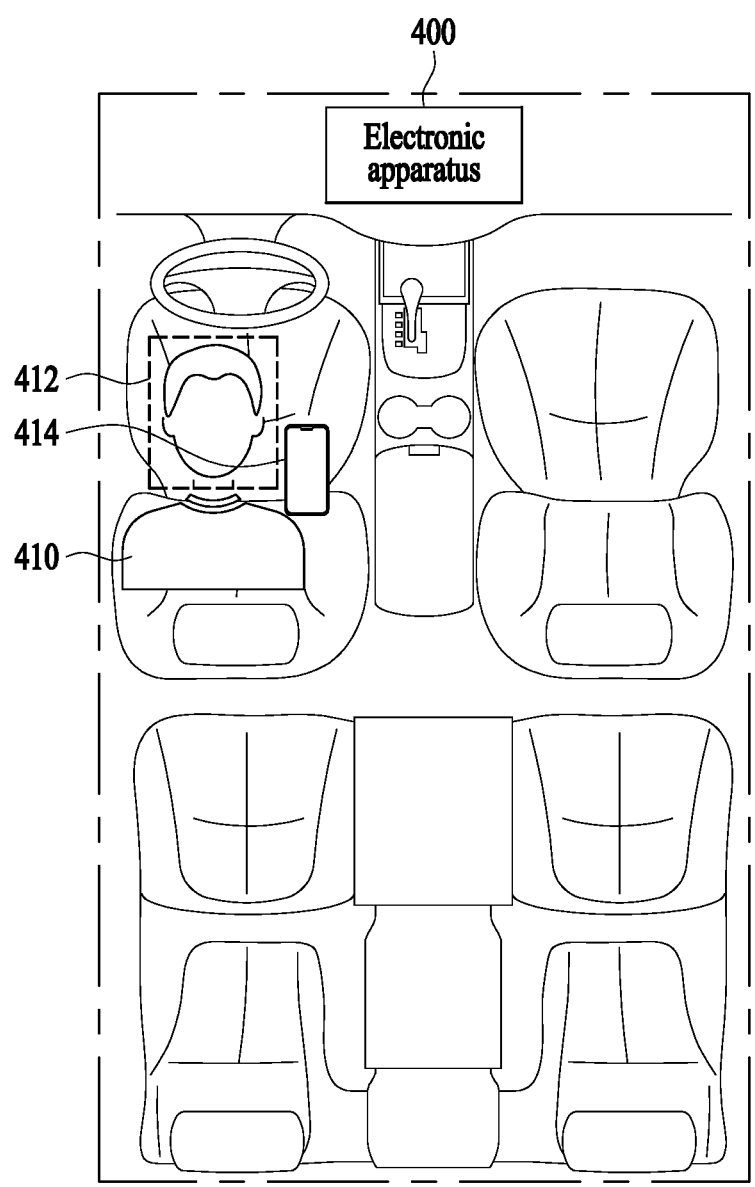
FIG. 4 illustrates an operation of an electronic apparatus according to an example embodiment.

FIG. 4 illustrates an operation of an electronic apparatus according to an example embodiment.

An electronic apparatus 400 may be included in a vehicle. The vehicle may be, for example, an autonomous vehicle.

The electronic apparatus 400 may recognize a face 412 of a passenger 410. When a terminal 414 is recognized as a terminal possessed by the passenger 410, the electronic apparatus 400 may store information on the recognized face 412 in association with the terminal 414. Specifically, the electronic apparatus 400 may store information on the face 412 of the passenger 410 and information on the terminal 414 in a database as mutually corresponding information.

In an example embodiment, the electronic apparatus 400 may recognize the face 412 of the passenger 410 through a sensor. The electronic apparatus 400 may recognize whether the terminal 414 is a terminal possessed by the passenger 410. For example, when a distance between a position of the passenger 410 and a position of the terminal 414 is within a preset range, the electronic apparatus 400 may recognize the terminal 414 as the terminal possessed by the passenger 410. When the terminal 414 is recognized as the terminal possessed by the passenger 410, the electronic apparatus 400 may store the information on the face 412 of the passenger 410 in association with the terminal 414.

In another example embodiment, the electronic apparatus 400 may recognize the face 412 of the passenger 410 and the terminal 414 belonging to the passenger 410 through a sensor. For example, the electronic apparatus 400 may use an image sensor of the vehicle to recognize the face 412 of the passenger 410 and the terminal 414 belonging to the passenger 410. Also, the electronic apparatus 400 may store the information on the face 412 of the passenger 410 in association with the terminal 414.

Figure 5:
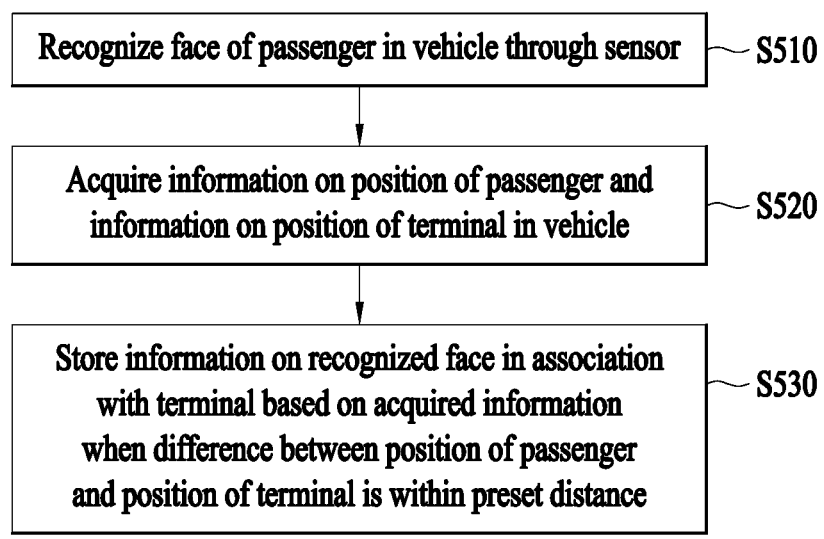
FIG. 5 is a flowchart illustrating an example of an operation method of an electronic apparatus.

FIG. 5 is a flowchart illustrating an example of an operation method of an electronic apparatus.

In operation S510, the electronic apparatus 400 may recognize a face of a passenger in a vehicle through a sensor. Specifically, an in-vehicle sensor may sense the passenger and the face of the passenger. The electronic apparatus 400 may recognize the face of the passenger by acquiring a sensing result from the in-vehicle sensor.

In operation S520, the electronic apparatus 400 may acquire information on a position of the passenger and information on a position of a terminal in the vehicle.

The electronic apparatus 400 may acquire the information on the position of the passenger through a sensor. Specifically, the electronic apparatus 400 may use an image sensor or a distance sensor to acquire the information on the position of the passenger in the vehicle. In one example, the electronic apparatus 400 may acquire information on coordinates of the position of the passenger in the vehicle. In another example, the electronic apparatus 400 may acquire information on a seat of the passenger in the vehicle.

In an example embodiment, the electronic apparatus 400 may acquire information on a position of a terminal through a sensor. Specifically, the electronic apparatus 400 may use an image sensor or a distance sensor to acquire the information on the terminal in the vehicle. In one example, the electronic apparatus 400 may acquire information on coordinates of the terminal in the vehicle. In another example, the electronic apparatus 400 may acquire information on a seat in which the terminal is located in the vehicle.

In another example embodiment, the electronic apparatus 400 may acquire information on a position of a terminal through triangulation. In one example, the electronic apparatus 400 may use Bluetooth communication to acquire the information on the coordinates of the position of the terminal in the vehicle through the triangulation for the terminal. In another example, the electronic apparatus 400 may use a distance sensor to acquire the information on the coordinates of the position of the terminal in the vehicle through the triangulation for the terminal.

In the present disclosure, the terminal may be implemented as a computer or a portable terminal capable of accessing a server or another terminal through a network. Here, the computer may include, for example, a laptop computer, a desktop computer, and a notebook equipped with a web browser. The portable terminal may be a wireless communication device ensuring a portability and a mobility, and include any type of handheld wireless communication device, for example, a tablet PC, a smartphone, a communication-based terminal such as international mobile telecommunication (IMT), code division multiple access (CDMA), W-code division multiple access (W-CDMA), and long term evolution (LTE).

In operation S530, when a difference between the position of the passenger and the position of the terminal is within a preset distance, the electronic apparatus 400 may store information on the recognized face in association with the terminal based on the information acquired in operation S520. Specifically, when the difference between the position of the passenger and the position of the terminal is within the preset distance, the electronic apparatus 400 may recognize the terminal as a terminal possessed by the passenger. Accordingly, the electronic device 400 may store the information on the face of the passenger to be associated with the terminal.

When the terminal is recognized as a terminal possessed by the passenger, the electronic apparatus 400 may store the information on the face of the passenger and the information on the terminal in a database as mutually corresponding information. For example, the electronic apparatus 400 may assign the same ID to the information on the face of the passenger and the information on the terminal and store the information in the database.

In another example embodiment, the electronic apparatus 400 may recognize a face of a passenger in a vehicle through a sensor and transmit information on the recognized face to one or more terminals in the vehicle. Thereafter, the electronic apparatus 400 may store information on the recognized face of the passenger in association with a terminal among the one or more terminals based on information input in the one or more terminals. A related example will be described with reference to FIG. 6.

The electronic apparatus 400 may acquire information on a voice of the passenger and store the information on the voice of the passenger in association with a terminal of the passenger. In one example, the passenger may input information on the voice of the passenger through the terminal of the passenger. In this example, the electronic apparatus 400 may acquire the information on the voice of the passenger through the terminal of the passenger and store the information on the voice of the passenger in association with the terminal of the passenger. In another example, the electronic apparatus 400 may acquire information on the voice of the passenger through an in-vehicle sensor. When the terminal is recognized as a terminal possessed by the passenger, the electronic apparatus 400 may store the information on the voice of the passenger in association with the terminal of the passenger. Also, the electronic apparatus 400 may store the information on the face of the passenger and the information on the voice of the passenger in association with the terminal of the passenger.

As such, the electronic apparatus 400 may store the information on the face of the passenger in association with the terminal of the passenger. Through this, the electronic apparatus 400 may improve passenger's convenience in a vehicular environment using face information and terminal information stored in association with each other. For example, the electronic apparatus 400 may recognize the terminal of the passenger by recognizing the face of the passenger and establish communication connection with the terminal of the passenger by recognizing the face of the passenger, which may lead to enhanced passenger's convenience in the vehicular environment.

Figure 6:
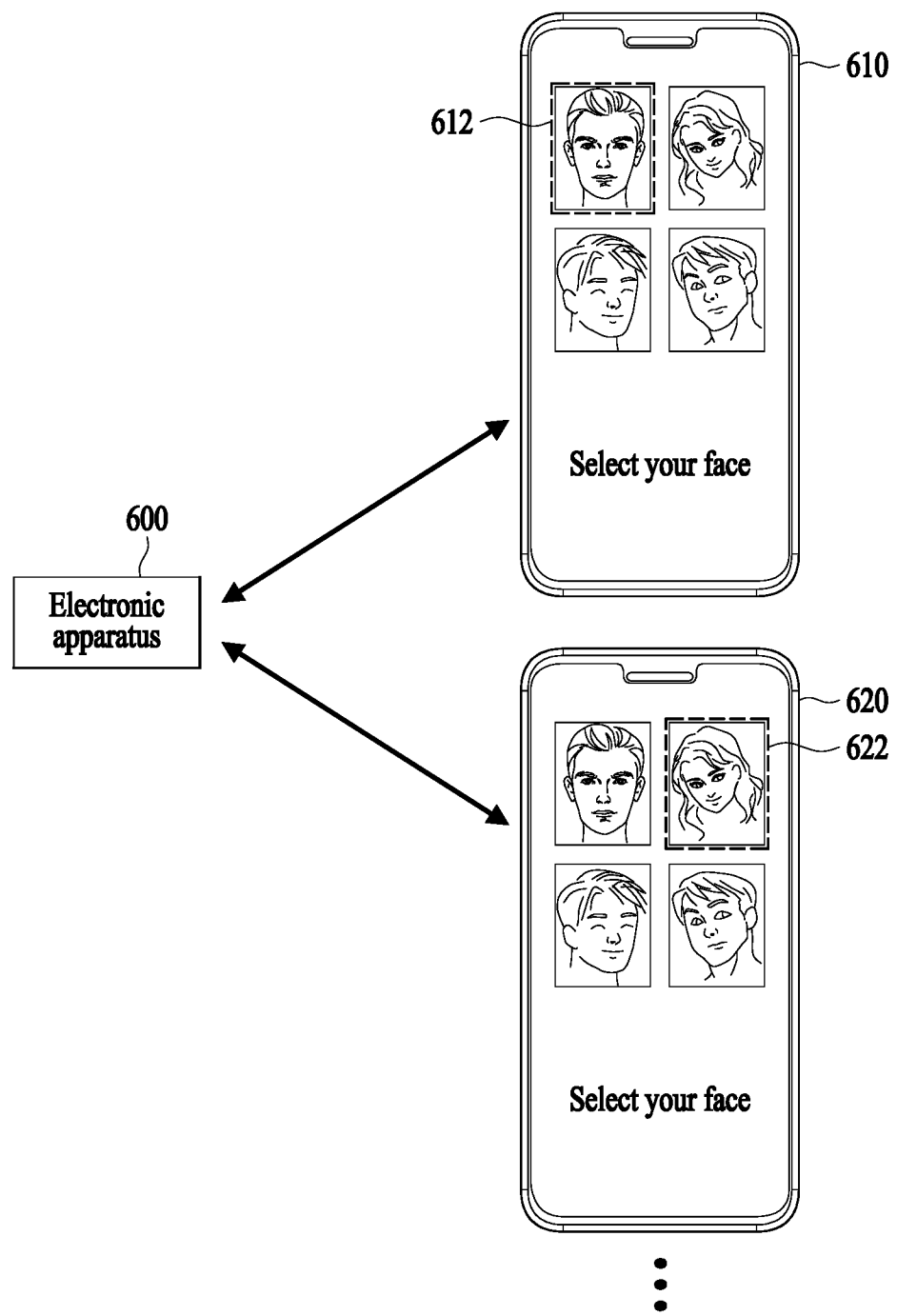
FIG. 6 illustrates an electronic apparatus storing information on a face of a passenger in association with a terminal according to an example embodiment.

FIG. 6 illustrates an electronic apparatus storing information on a face of a passenger in association with a terminal according to an example embodiment.

An electronic apparatus 600 may recognize a face of a passenger in a vehicle and transmit information on the recognized face to one or more terminals 610 and 620 in the vehicle. For example, when a terminal to be associated with the recognized face of the passenger is not recognized, the electronic apparatus 600 may transmit the information on the recognized face to the one or more terminals 610 and 620. Also, the electronic apparatus 600 may request the one or more terminals 610 and 620 to select the information on the recognized face.

One or more passengers may select face information provided to the one or more terminals 610 and 620. Specifically, the one or more passengers may select face information determined as matching a face of the corresponding passenger from information of a plurality of faces recognized by the electronic apparatus 600 and input the selected face information through the one or more terminals 610 and 620. For example, a first passenger may select first face information 612 as his or her face information from the information on the plurality of faces recognized by the electronic apparatus 600 and input the selected first face information 612 to the terminal 610 of the first passenger. Also, a second passenger may select second face information 622 as his or her face information from the information on the plurality of faces recognized by the electronic apparatus 600 and input the selected second face information 622 to the terminal 620 of the second passenger.

The electronic apparatus 600 may store the information on the recognized face in association with a terminal among one or more terminals based on the information input to the one or more terminals 610 and 620. For example, the electronic apparatus 600 may store the first face information 612 in association with the terminal 610 of the first passenger, and store the second face information 622 in association with the terminal 620 of the second passenger.

Figure 7:
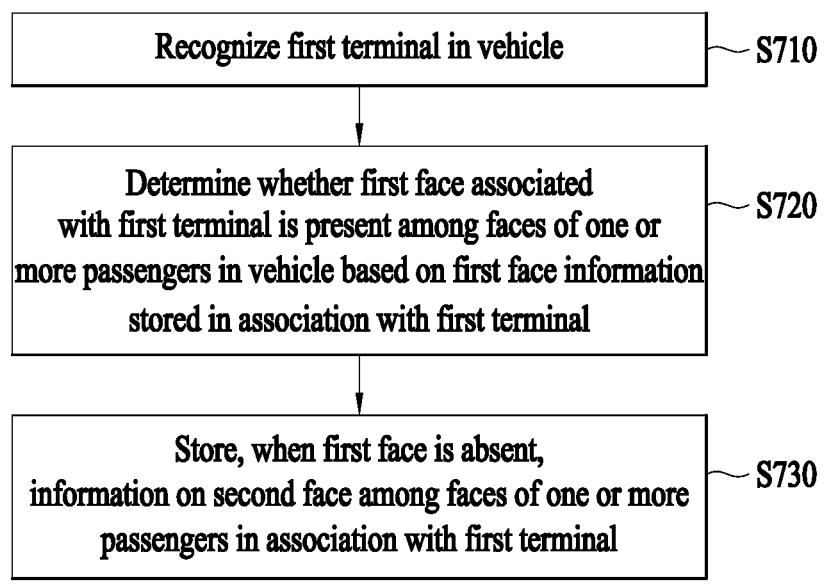
FIG. 7 is a flowchart illustrating another example of an operation method of an electronic apparatus.

FIG. 7 is a flowchart illustrating another example of an operation method of an electronic apparatus.

In operation S710, the electronic apparatus 400 may recognize a first terminal in a vehicle. The electronic apparatus 400 may recognize the first terminal that has been communication-connected with the electronic apparatus 400 in the vehicle. For example, the electronic apparatus 400 may recognize the first terminal that has been paired with the electronic apparatus 400 through Bluetooth connection.

In operation S720, the electronic apparatus 400 may determine whether a first face associated with the first terminal is present among faces of one or more passengers in the vehicle based on first face information stored in association with the first terminal recognized in operation S710.

The electronic apparatus 400 may recognize the first face information stored in association with the first terminal recognized in operation S710. Specifically, since the first face information of the first passenger previously recognized by the electronic apparatus 400 is stored in association with the first terminal of the first passenger, the electronic apparatus 400 may recognize the first face information stored in association with the first terminal of the first passenger recognized in operation S710. Thereafter, the electronic apparatus 400 may determine whether the first face is present among the faces of the one or more passengers recognized in the vehicle. In other words, the electronic apparatus 400 may determine whether a face matching the first face is present among the faces of the one or more passengers.

In operation S730, as a determination result of operation S720, when the first face is absent, the electronic apparatus 400 may store information on a second face among the faces of the one or more passengers in association with the first terminal.

In an example embodiment, as a determination result of operation S720, when the first face is absent, the electronic apparatus 400 may determine whether the first face is present among the faces of the one or more passengers using a more precise facial recognition technique. For example, the first face of the first passenger may be partially deformed due to make-up or plastic surgery. In this example, the electronic apparatus 400 may recognize the second face into which the first face is partially deformed, from the faces of the one or more passengers using an anti-spoofing technique. Thus, the electronic apparatus 400 may store information on the second face in association with the first terminal. In other words, the electronic apparatus 400 may update existing information on the first face stored in association with the first terminal, with the information on the second face.

In another example embodiment, as a determination result of operation S720, when the first face is absent, the electronic apparatus 400 may identify the second passenger as an owner of the first terminal, and store information on the second face of the second passenger in association with the first terminal. For example, the owner of the first terminal may be changed from the first passenger to the second passenger. In this example, when a difference between a position of the first terminal and a position of the second passenger is within a preset distance, the electronic apparatus 400 may store information on the second face of the second passenger in association with the first terminal. In other words, the electronic apparatus 400 may update existing information on the first face stored in association with the first terminal, with the information on the second face.

As a determination result of operation S720, when the first face is present, the electronic apparatus 400 may maintain the information on the first face stored in association with the first terminal without updating.

Figure 8:
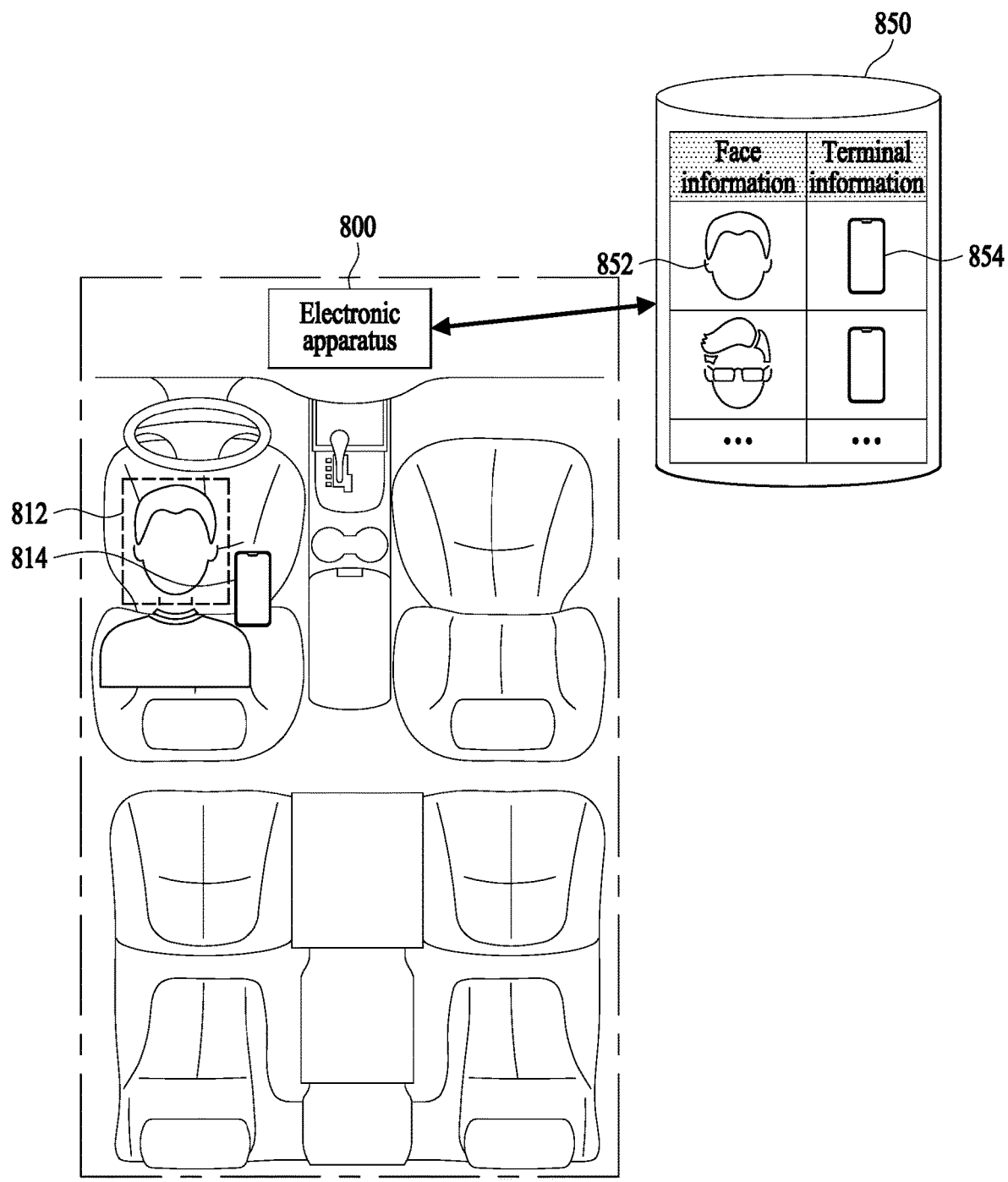
FIG. 8 illustrates an operation of an electronic apparatus recognizing a face of a passenger according to an example embodiment.

FIG. 8 illustrates an operation of an electronic apparatus recognizing a face of a passenger according to an example embodiment.

An electronic apparatus 800 may recognize a face of a passenger of a vehicle, recognize a terminal associated with the recognized face based on face information and terminal information correspondingly stored in a database, and establish wireless communication connection with the recognized terminal.

Referring to FIG. 8, the electronic apparatus 800 may recognize a face 812 of a first passenger located in a vehicle using a sensor. The electronic apparatus 800 may search a database 850 to recognize a terminal 814 corresponding to the recognized face 812. Specifically, the database 850 may include face information of passengers and terminal information corresponding to the face information. For example, the database 850 may include information 852 on the face 812 of the first passenger and information 854 of the terminal 814 of a first passenger. Accordingly, the electronic apparatus 800 may recognize the terminal 814 associated with the face 812 of the first passenger based on information stored in the database 850, and establish communication connection with the terminal 814. For example, the electronic apparatus 800 may establish Bluetooth-pairing connection with the terminal 814.

The electronic apparatus 800 may execute an application in a terminal in response to the communication connection with the terminal of the passenger being established. For example, the electronic apparatus 800 may execute a music application in the terminal to play music through a speaker in the vehicle. Also, the electronic apparatus 800 may recognize the face of the passenger and thus, execute an application in the terminal using a face recognition result. For example, the electronic apparatus 800 may recognize an emotion state of the passenger by recognizing the face of the passenger and play music appropriate for the recognized emotion state by executing a music application in the terminal.

The electronic apparatus 800 may recognize a voice of the passenger, recognize a terminal associated with the recognized voice based on voice information and terminal information correspondingly stored in a database, and establish communication connection with the recognized terminal. For example, in response to a speech "connect" of the first passenger being recognized, the electronic apparatus 800 may establish Bluetooth-pairing connection with the terminal of the first passenger.

The electronic apparatus 800 may recognize the face of the passenger and control at least one device in the vehicle based on a recognition result. For example, the electronic apparatus 800 may recognize an emotion state of the passenger based on a face recognition result of the passenger and adjust a color of a lighting device around the passenger based on the recognized emotion state.

The electronic apparatus 800 may set an authority to control the terminal based on face information associated with the terminal to which the communication connection is established. Specifically, the electronic apparatus 800 may recognize, as an owner of the terminal, a passenger having a face associated with the terminal to which the communication connection is established. Thus, the electronic apparatus 800 may allow only the passenger recognized as the owner to control the terminal. For example, the electronic apparatus 800 may allow only the passenger recognized as the owner of the terminal to which the communication connection is established, to input destination information to the terminal.

The electronic apparatus 800 may recognize schedule information of the passenger stored in each device in the vehicle, and input place information corresponding to a first schedule to a navigator as the destination information based on the recognized schedule information. In addition, the electronic apparatus 800 may recognize a face of a driver in the vehicle and input place information stored in a terminal associated with the recognized face, to the navigator as the destination information. Also, the electronic apparatus 800 may recognize the face of the passenger and recognize an emotion state of the passenger based on the recognized face. Thus, the electronic apparatus 800 may input a place suitable for the emotion state to the navigator as the destination information.

The electronic apparatus 800 may establish communication connection with the terminal of the passenger. When a call is received in the terminal, the electronic apparatus 800 may recognize a voice command of the passenger to provide a call function through a speaker of the terminal or provide the call function through a speaker in the vehicle.

The electronic apparatus 800 may recognize the voice of the passenger and establish communication connection with a terminal associated with the voice of the passenger. In addition, the electronic apparatus 800 may recognize a voice command of the passenger and execute an application of the communication-connected terminal. Also, the electronic apparatus 800 may recognize an emotion state of the passenger by recognizing the face of the passenger and execute an application of the terminal based on the recognized emotion state. For example, the electronic apparatus 800 may search for a music list suitable for the emotion state of the passenger and suggest the music list to the passenger.

The electronic apparatus 800 may control an in-vehicle device by recognizing the face of the passenger. In one example, the electronic apparatus 800 may recognize an age of the passenger by recognizing the face of the passenger. When the passenger is at least middle-aged, the electronic apparatus 800 may increase a font size of the navigator in the vehicle. In another example, the electronic apparatus 800 may recognize an age of the passenger by recognizing the face of the passenger and provide an image suitable for the age of the passenger through a display in front of the passenger.

Figure 9:
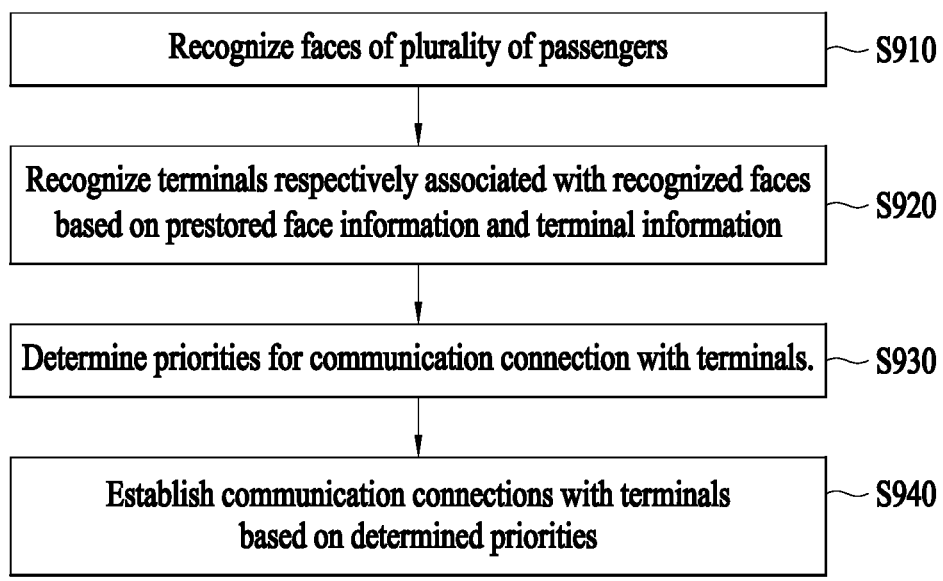
FIG. 9 is a flowchart illustrating another example of an operation method of an electronic apparatus.

FIG. 9 is a flowchart illustrating another example of an operation method of an electronic apparatus.

In operation S910, the electronic apparatus 400 may recognize faces of a plurality of passengers located in a vehicle. Specifically, the electronic apparatus 400 may recognize the faces of the plurality of passengers using a sensor.

In operation S920, the electronic apparatus 400 may recognize terminals respectively associated with the recognized faces based on prestored face information and terminal information. Specifically, the database may include face information of the passengers and terminal information corresponding to the face information. Thus, the electronic apparatus 400 may recognize the terminals associated with the recognized faces based on the face information and terminal information stored in the database.

In operation S930, the electronic apparatus 400 may determine priorities for communication connection with the recognized terminals.

In an example embodiment, the electronic apparatus 400 may determine priorities for communication connection with the terminals corresponding to the recognized faces based on information on the recognized faces. In one example, the electronic apparatus 400 may determine communication connection with a terminal of a passenger having a designated face, to be a first priority based on the information on the recognized faces. In this example, the electronic apparatus 400 may recognize a face of a driver among the recognized faces based on the information on the recognized faces and determine communication connection with a terminal of the driver to be a first priority. In another example, the electronic apparatus 400 may determine priorities for communication connection with the terminals of the passengers based on ages of the passengers determined based on information on the recognized faces. In this example, an electronic apparatus 900 may determine priorities for communication connection by giving a higher priority to a terminal of an elderly passenger among the passengers. In another example, the electronic apparatus 400 may determine priorities for communication connection with the terminals of the passengers based on states of the passengers determined based on information on the recognized faces. In this example, the electronic apparatus 400 may recognize that the first passenger is in an emergency state based on the information on the recognized faces, and determine the priorities for communication connection by giving a higher priority to the terminal of the first passenger.

In another example embodiment, the electronic apparatus 400 may determine priorities for communication connection with terminals of passengers based on information stored in the terminals. In one example, the electronic apparatus 400 may determine priorities for communication connection with the terminals based on schedule information stored in the terminals. In another example, the electronic apparatus 400 may determine priorities for communication connection with the terminals based on destination information stored in the terminals. For example, when destinations of the passengers stored in the terminals are different in a shared-car environment, the electronic apparatus 400 may determine priorities for communication connection by giving a higher priority to a terminal of a passenger scheduled to get off first.

In operation S940, the electronic apparatus 400 may establish the communication connections with the terminals based on the determined priorities. The electronic apparatus 400 may sequentially establish the communication connections with the terminals based on the determined priorities, and establish communication connection with a highest priority for a terminal having the highest priority.

For example, the electronic apparatus 400 may determine ages of passengers located in a vehicle by recognizing faces of the passengers. When a vehicle accident occurs, the electronic apparatus 400 may sequentially establish communication connections with terminals of the passengers in an order of the ages and transmit an emergency message to phone numbers stored in the terminals of the passengers.

Figure 10:
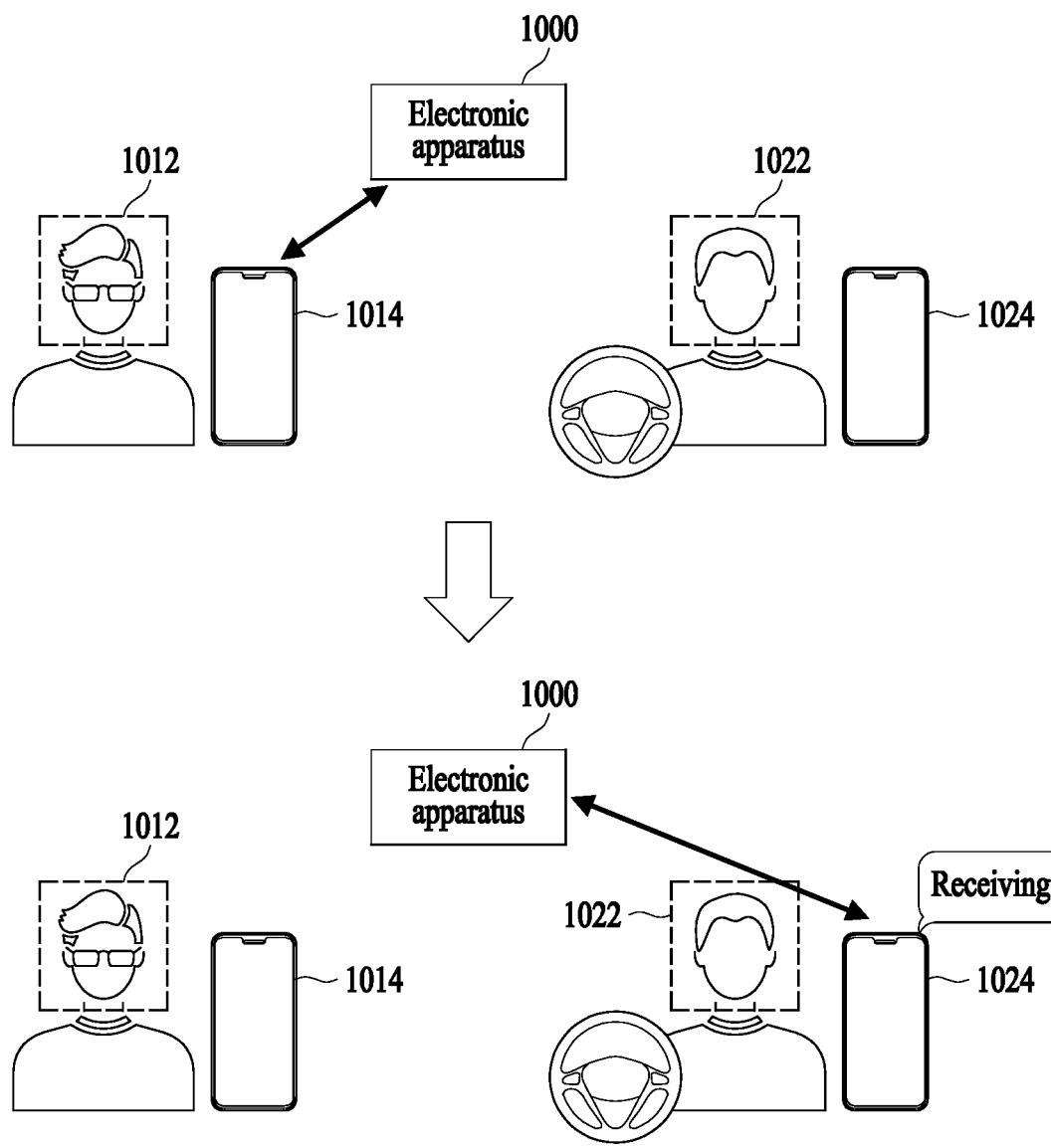
FIG. 10 illustrates an electronic apparatus establishing communication connection by changing a terminal according to an example embodiment.

FIG. 10 illustrates an electronic apparatus establishing communication connection by changing a terminal according to an example embodiment.

An electronic apparatus 1000 may recognize a face 1012 of a first passenger and recognize a terminal 1014 of the first passenger corresponding to the face 1012 based on prestored face information and terminal information. Also, the electronic apparatus 1000 may recognize a face 1022 of a second passenger and recognize a terminal 1024 of the second passenger corresponding to the face 1022 based on prestored face information and terminal information.

Referring to an upper portion of FIG. 10, the electronic apparatus 1000 may preferentially establish communication connection with the terminal 1014 between the terminals 1014 and 1024. For example, the electronic apparatus 1000 may establish Bluetooth communication connection with the terminal 1014 and play music through a speaker in the vehicle by executing a music application of the terminal 1014.

Referring to the upper portion and a lower portion of FIG. 10, the electronic apparatus 1000 may change a terminal corresponding to a target for communication connection from the terminal 1014 to the terminal 1024. Specifically, when a preset event occurs in the terminal 1024 of the second passenger, the electronic apparatus 1000 may determine whether face information associated with the terminal 1024 is preset passenger face information. As a determination result, when the face information associated with the terminal 1024 is the preset passenger face information, the electronic apparatus 1000 may establish communication connection with the terminal 1024 following the terminal 1014. For example, the electronic apparatus 1000 may recognize an event that the terminal 1024 receives a call. In this example, when the face information associated with the terminal 1024 is information on a face of a driver, the electronic apparatus 1000 may change a terminal corresponding to a target for communication connection from the terminal 1014 to the terminal 1024. For example, the electronic apparatus 1000 may suspend executing the music application of the terminal 1014 and establish the Bluetooth communication connection with the terminal 1024, thereby implementing a voice call of the second passenger corresponding to the driver through the speaker in the vehicle.

Figure 11:
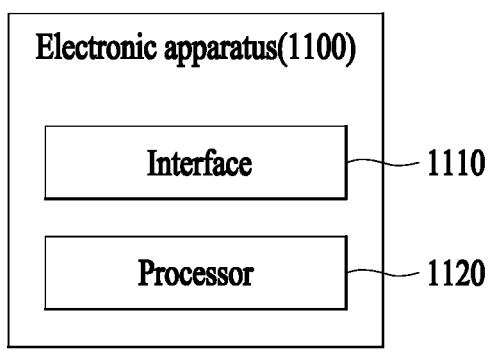
FIG. 11 is a block diagram illustrating an electronic apparatus.

FIG. 11 is a block diagram illustrating an electronic apparatus.

According to an example embodiment, an electronic apparatus 1100 may include an interface 1110 and a processor 1120. FIG. 11 illustrates only components of the electronic apparatus 1100 related to the present embodiment. However, it will be understood by those skilled in the art that other general-purpose components may be further included in addition to the components illustrated in FIG. 11. Since the electronic apparatus 1100 corresponds to the electronic apparatuses 400, 600, 800, and 1000, repeated description will be omitted.

The interface 1110 may acquire sensing information of a face of a passenger in a vehicle from a sensor. The interface 1110 may acquire information on a position of the passenger and information on a position of a terminal in the vehicle.

The processor 1120 may control an overall operation of the electronic apparatus 1100 and process data and a signal. The processor 11201320 may include at least one hardware unit. In addition, the processor 1120 may operate through at least one software module generated by executing program codes stored in a memory.

The processor 1120 may recognize the face of the passenger based on the sensing information acquired by the interface 1110.

When a difference between the position of the passenger and the position of the vehicle is within a preset distance, the processor 1120 may store information on the recognized face in association with the terminal based on the information on the position of the passenger and the information on the position of the terminal acquired by the interface 1110.

The processor 1120 may recognize a first terminal in the vehicle. The processor 1120 may determine whether a first face associated with the first terminal is present among faces of one or more passengers in the vehicle, based on first face information stored in association with the first terminal. As a determination result, when the first face is absent, the processor 1120 may store information on a second face among the faces of one or more passengers in association with the first terminal.

The processor 1120 may transmit the information on the recognized face to one or more terminals in the vehicle through a communication part. The processor 1120 may store the information on the recognized face in association with a terminal among the one or more terminals, based on information input in the one or more terminals.

The interface 1110 may acquire information on a voice of the passenger. The processor 1120 may store the information on the voice in association with the terminal.

The processor 1120 may recognize a first face of a first passenger. The processor 1120 may recognize a first terminal associated with the recognized first face based on terminal information and face information correspondingly stored in a database. The processor 1120 may establish communication connection with the first terminal.

The processor 1120 may recognize faces of a plurality of passengers. The processor 1120 may recognize terminals respectively associated with the recognized faces based on terminal information and face information correspondingly stored in a database. The processor 1120 may determine priorities for communication connection with the terminals. The processor 1120 may establish communication connection with the terminals based on the determined priorities.

The processor 1120 may determine priorities for communication connection with the terminals based on information on the recognized faces.

The processor 1120 may establish communication connection with the first terminal of the first passenger. When a preset event occurs in a second terminal of a second passenger, the processor 1120 may determine whether face information associated with the second terminal is preset passenger face information. As a determination result, when the face information associated with the second terminal is the preset passenger face information, the processor 1120 may establish communication connection with the second terminal.

The processor 1120 may establish communication connection with the first terminal. The processor 1120 may allow only a passenger having a face associated with the first terminal to control the first terminal, based on face information stored in association with the first terminal.

According to example embodiments, since an electronic apparatus stores information on a face of a passenger in association with a terminal of the passenger, it is possible to improve passenger's convenience in a vehicular environment using face information and terminal information stored in association with each other. For example, the electronic apparatus may recognize a terminal of a passenger by recognizing a face of the passenger and establish communication connection with a terminal of the passenger by recognizing the face of the passenger, which may lead to enhanced passenger's convenience in the vehicular environment.

Effects are not limited to the aforementioned effects, and other effects not mentioned will be clearly understood by those skilled in the art from the description of the claims.

The devices in accordance with the above-described embodiments may include a processor, a memory which stores and executes program data, a permanent storage such as a disk drive, a communication port for communication with an external device, and a user interface device such as a touch panel, a key, and a button. Methods realized by software modules or algorithms may be stored in a computer-readable recording medium as computer-readable codes or program commands which may be executed by the processor. Here, the computer-readable recording medium may be a magnetic storage medium (for example, a read-only memory (ROM), a random-access memory (RAM), a floppy disk, or a hard disk) or an optical reading medium (for example, a CD-ROM or a digital versatile disc (DVD)). The computer-readable recording medium may be dispersed to computer systems connected by a network so that computer-readable codes may be stored and executed in a dispersion manner. The medium may be read by a computer, may be stored in a memory, and may be executed by the processor.

The present embodiments may be represented by functional blocks and various processing steps. These functional blocks may be implemented by various numbers of hardware and/or software configurations that execute specific functions. For example, the present embodiments may adopt direct circuit configurations such as a memory, a processor, a logic circuit, and a look-up table that may execute various functions by control of one or more microprocessors or other control devices. Similarly to that elements may be executed by software programming or software elements, the present embodiments may be implemented by programming or scripting languages such as C, C++, Java, and assembler including various algorithms implemented by combinations of data structures, processes, routines, or of other programming configurations. Functional aspects may be implemented by algorithms executed by one or more processors. In addition, the present embodiments may adopt the related art for electronic environment setting, signal processing, and/or data processing, for example. The terms "mechanism", "element", "means", and "configuration" may be widely used and are not limited to mechanical and physical components. These terms may include meaning of a series of routines of software in association with a processor, for example.

The above-described embodiments are merely examples and other embodiments may be implemented within the scope of the following claims.

What is claimed is:

1. An operation method of an electronic apparatus, the method comprising:
   recognizing a face of a passenger in a vehicle through a sensor;
   acquiring information on a position of the passenger and information on a position of a terminal in the vehicle;
   storing, when a difference between the position of the passenger and the position of the terminal in the vehicle is within a preset distance, information on the recognized face in association with the terminal based on the acquired information;
   recognizing a first terminal in the vehicle;
   determining whether a first face associated with the first terminal is present among faces of one or more passengers in the vehicle, based on first face information stored in association with the first terminal; and
   storing information on a second face among the faces in association with the first terminal when the first face is absent as a determination result.

2. The operation method of claim 1, further comprising:
   transmitting the information on the recognized face to one or more terminals in the vehicle; and
   storing the information on the recognized face in association with a terminal among the one or more terminals, based on information input in the one or more terminals.

3. The operation method of claim 1, further comprising:
   acquiring information on a voice of the passenger; and
   storing the information on the voice in association with the terminal.

4. The operation method of claim 1, further comprising:
   recognizing a third face of a third passenger;
   recognizing a third terminal associated with the recognized third face based on terminal information and face information correspondingly stored in a database; and
   establishing communication connection with the third terminal.

5. The operation method of claim 1, further comprising:
   recognizing faces of a plurality of passengers;
   recognizing terminals respectively associated with the recognized faces based on terminal information and face information correspondingly stored in a database;
   determining priorities for communication connection with the terminals; and
   establishing communication connection with the terminals based on the determined priorities.

6. The operation method of claim 5, wherein the determining of the priorities comprises:
   determining priorities for communication connection with the terminals based on information on the recognized faces.

7. An operation method of an electronic apparatus, the method comprising:
   recognizing a face of a passenger in a vehicle through a sensor;
   acquiring information on a position of the passenger and information on a position of a terminal in the vehicle;
   storing, when a difference between the position of the passenger and the position of the terminal in the vehicle is within a preset distance, information on the recognized face in association with the terminal based on the acquired information;
   establishing communication connection with a first terminal of a first passenger;
   determining whether face information associated with a second terminal of a second passenger is preset passenger face information when a preset event occurs in the second terminal; and
   establishing communication connection with the second terminal when the face information associated with the second terminal is the preset passenger face information as a determination result.

8. The operation method of claim 1, further comprising:
   establishing communication connection with a fourth terminal; and
   allowing only a passenger having a face associated with the fourth terminal to control the fourth terminal, based on face information stored in association with the fourth terminal.

9. A non-transitory non-volatile computer-readable recording medium comprising a computer program for performing the operation method of claim 1.

10. An electronic apparatus comprising:
    an interface configured to acquire sensing information of a face of a passenger in a vehicle from a sensor; and
    a processor configured to recognize the face of the passenger based on the acquired sensing information, and store information on the recognized face in association with the terminal based on information on a position of the passenger acquired through the interface and information on a position of a terminal in the vehicle when a difference between the position of the passenger and the position of the terminal is within a preset distance,
    wherein the processor is configured to:
    recognize a first terminal in the vehicle;
    determine whether a first face associated with the first terminal is present among faces of one or more passengers in the vehicle, based on first face information stored in association with the first terminal; and
    store information on a second face among the faces in association with the first terminal when the first face is absent as a determination result.

11. The electronic apparatus of claim 10, wherein the processor is configured to:
    transmit the information on the recognized face to one or more terminals in the vehicle; and
    store the information on the recognized face in association with a terminal among the one or more terminals, based on information input in the one or more terminals.

12. The electronic apparatus of claim 10, wherein the interface is configured to acquire information on a voice of the passenger, and
    the processor is configured to store the information on the voice in association with the terminal.

13. The electronic apparatus of claim 10, wherein the processor is configured to:
    recognize a third face of a third passenger;

recognize a third terminal associated with the recognized third face based on terminal information and face information correspondingly stored in a database; and establish communication connection with the third terminal.

14. The electronic apparatus of claim 10, wherein the processor is configured to:

recognize faces of a plurality of passengers;

recognize terminals respectively associated with the recognized faces based on terminal information and face information correspondingly stored in a database;

determine priorities for communication connection with the terminals; and establish communication connection with the terminals based on the determined priorities.

15. The electronic apparatus of claim 14, wherein the processor is configured to:

determine priorities for communication connection with the terminals based on information on the recognized faces.

16. The electronic apparatus of claim 10, wherein the processor is configured to:

establish communication connection with a fourth terminal; and allow only a passenger having a face associated with the fourth terminal to control the fourth terminal, based on face information stored in association with the fourth terminal.

17. An electronic apparatus comprising:

an interface configured to acquire sensing information of a face of a passenger in a vehicle from a sensor; and a processor configured to recognize the face of the passenger based on the acquired sensing information, and store information on the recognized face in association with the terminal based on information on a position of the passenger acquired through the interface and information on a position of a terminal in the vehicle when a difference between the position of the passenger and the position of the terminal is within a preset distance, wherein the processor is configured to:

establish communication connection with a first terminal of a first passenger;

determine whether face information associated with a second terminal of a second passenger is preset passenger face information when a preset event occurs in the second terminal; and establish communication connection with the second terminal when the face information associated with the second terminal is the preset passenger face information as a determination result.

18. A vehicle comprising:

a sensor; and an electronic apparatus that recognizes a face of a passenger in the vehicle based on sensing information acquired from the sensor, acquires information on a position of the passenger and information on a position of a terminal in the vehicle, and stores, when a difference between the position of the passenger and the position of the vehicle is within a preset distance, information on the recognized face in association with the terminal based on the acquired information, wherein the electronic apparatus is configured to:

recognize a first terminal in the vehicle;

determine whether a first face associated with the first terminal is present among faces of one or more passengers in the vehicle, based on first face information stored in association with the first terminal; and store information on a second face among the faces in association with the first terminal when the first face is absent as a determination result.

* * * * *